UNITED STATES PATENT OFFICE.

ROBERT H. ADAMS, OF RIDGEWOOD, NEW JERSEY, AND HOWARD BEATTY, OF HINSDALE, ILLINOIS.

BUTTER SUBSTITUTE.

1,247,482.      Specification of Letters Patent.      Patented Nov. 20, 1917.

No Drawing.      Application filed February 10, 1917. Serial No. 147,857.

*To all whom it may concern:*

Be it known that ROBERT H. ADAMS and HOWARD BEATTY, citizens of the United States, and residents of Ridgewood, New Jersey, and Hinsdale, Illinois, respectively, have invented certain new and useful Improvements in Butter Substitutes, of which the following is a specification.

This invention relates to the manufacture of edible butter substitutes especially adapted for either culinary or table purposes and has for its objects the production of sweet edible products substantially free from any unnatural, i. e., chemically-prepared fatty or inorganic bodies, without the employment of cold-water-jacketed churns, which products will preserve their original condition and flavor.

We are aware it has been heretofore proposed to manufacture so-called "butterin" or butter substitutes from various oils including butternut oil, almond oil, olive oil and the like by treating the same, either with or without previous hydrogenation after the addition to such material of caseinous products as skim-milk, buttermilk, sourmilk, and especially fermented milk, so as to effect lactic acid fermentation. It has also been proposed, as described in Patent No. 1,014,457 of January 9th, 1912, to employ cocoanut butter in conjunction with cottolene, cow's butter, a small amount of coloring matter and salt to suit the taste, but none of the aforesaid products possess the characteristics of our improved butter substitute. Accordingly, our invention is intended as an improvement on the products of this general character.

In carrying out our invention we preferably proceed as follows:—Forty quarts of fresh milk, either whole or skimmed heated to approximately 180° F., this temperature being maintained for a period preferably of fifteen to twenty minutes when the mixture is rapidly cooled to about 75° F., the object of such heating being to effect substantial pasteurization of the milk and to prevent the initial souring thereof. During the treatment the milk is kept covered in order to prevent contamination thereof from outside sources. While the milk is still maintained at a temperature of 75° F. a small amount of lactic acid ferment, such as *Bacillus Bulgaricus* is introduced into the milk, preferably about 100 grams of ferment in the above quantity of forty quarts. Such ferment is thoroughly stirred into the milk and then the stirring is dispensed with for a period of three hours after which it is again stirred and the milk is allowed to remain without stirring, while still maintained at a temperature of 75° F., for a period of 22 to 24 hours until thoroughly set. Then the upper half inch of the mass is skimmed off to remove any possible contaminated material, and the balance of the mass forms what is known as the first culture. The latter, after having been beaten up to a smooth liquid is mixed with a fresh portion of milk previously pasteurized as above described, in the proportion of about 120 ounces to a forty quart can, and after thoroughly mixing said culture with the milk, the mass is maintained at a temperature preferably of 70° F., while still kept covered without stirring until the same is set, this requiring preferably about twenty-two to twenty-four hours. Then the mass is skimmed as before to a depth of one-half to three quarters of an inch, to remove any possible contaminated material and the remaining material is thoroughly beaten up. The latter then constitutes what is known as the second culture.

In order to manufacture the final product corresponding to what is known as margarin or butter substitute, another forty quart quantity of milk is pasteurized as above described, and is cooled to 65° F. (winter 70° F.), then 45% by weight of the second culture is added to said milk and the mixture is thoroughly stirred and also kept covered as above stated to prevent contamination. The temperature is then maintained at 65° F. (winter 70° F.) until the milk thickens, this requiring about 22 to 24 hours. It is then thoroughly stirred or beaten up and the milk is ready for use.

In order to preserve either the first or second culture in the event they are not immediately used, they should be thoroughly iced until used.

The aforesaid milk prepared by means of the second culture is then mixed with cocoanut butter to maintain it in a plastic but not liquid condition, said mixing being conducted in a suitable beating machine and the beating continued until the product is of even consistency and all solids of the milk have been thoroughly worked in. Preferably for 100 pounds of finished product we take 82 pounds of pure, unheated cocoanut butter or fat and about 20 pounds of ripened milk, and after mixing the cocoanut butter and the ripened milk as aforesaid, the resultant product is thoroughly washed with cold water until the effluent water is substantially pure or clean, then the mass is thoroughly drained and sufficient salt to suit the taste is added, preferably about two pounds for every 100 pounds of finished product, and also if desired suitable coloring matter, such as annato, carrot-yellow, or other desirable permissible coloring material. The product is then ready for use.

Having thus described our invention, what we claim and desire to secure by Letters Patent is:—

The herein described butter substitute comprising an intimate mixture of unaltered, normally solid fatty material derived from the cocoanut, and water insoluble solids of ripened milk in which the quantity of fatty material greatly exceeds the quantity of such ripened milk solids.

Signed at Chicago, in the county of Cook and State of Illinois, this 9th day of January, 1917, and at New York the 8th day of February, 1917, respectively.

HOWARD BEATTY.
R. H. ADAMS.

Witnesses as to Adams:
W. A. JONES,
WILLIAM C. HARTRON.